March 13, 1956  G. A. HANNAY  2,738,143
HOSE REEL

Filed April 7, 1955  2 Sheets-Sheet 1

INVENTOR
GEORGE A. HANNAY

BY  H. G. Lombard
ATTORNEY

March 13, 1956 G. A. HANNAY 2,738,143
HOSE REEL
Filed April 7, 1955 2 Sheets-Sheet 2
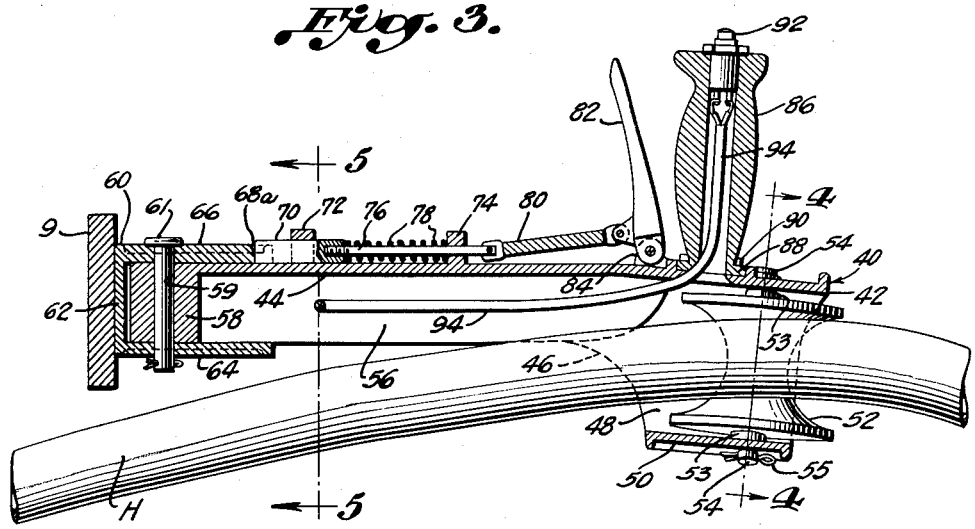
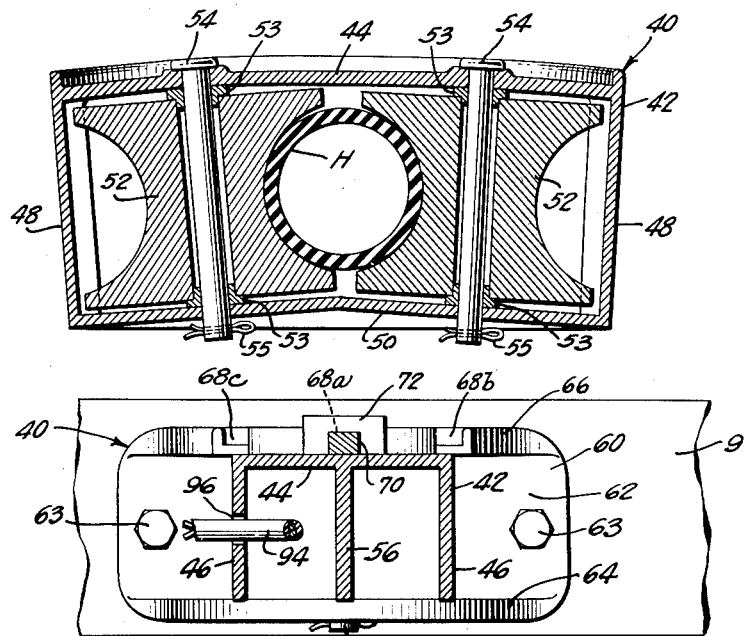
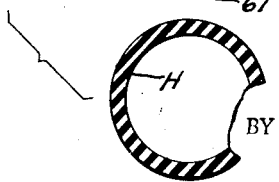
INVENTOR
GEORGE A. HANNAY
BY
ATTORNEY

United States Patent Office 2,738,143
Patented Mar. 13, 1956

2,738,143

HOSE REEL

George A. Hannay, Westerlo, N. Y., assignor to Clifford B. Hannay & Son, Inc., Westerlo, N. Y., a corporation of New York Application April 7, 1955, Serial No. 499,914

9 Claims. (Cl. 242—157)

This invention relates in general to hose reels or similar reels for rope, cable, etc., and deals, more particularly, with an improved guide or guiding unit for a hose reel, or the like, that facilitates winding or unwinding of the hose or other length of material similarly to a level-wind or fair lead device.

A primary object of the invention is to provide a guide or guiding device of this character as a relatively simple compact unit which may be readily incorporated in any of a number of different types of hose reels, or the like, as a component part of a new reel apparatus, or as an attachment to a hose reel or similar structure already in use, for facilitating winding and unwinding of the hose and minimizing wear thereon in a manner which prolongs the life of the hose for an extended period of satisfactory service and use.

In the use of hose reels on fuel delivery trucks, for example, the truck frequently must be so parked on a street or road, etc., that the unwinding of the hose to the point of delivery of the fuel requires a pronounced angular bending of the hose to the right or left of the reel that causes damaging kinking, chafing, and other undue wear on the hose such that the hose becomes faulty, worn and useless in a relatively short time and must be replaced all too often at unwarranted expense. Such hose usually is of the large heavy duty type that is quite costly, and accordingly, considerable savings are involved when the life and period of practical usefulness of the hose are prolonged through the use of the improved guiding device of the present invention.

Another object of the invention, accordingly, is to provide a guide or guiding unit of the kind described that is adapted to be installed on a hose reel or the like with a pivoted mounting by which the guide is swingable to different positions for leading the hose in any required angular relation to the reel without dangerous kinking, buckling or chafing of the hose as it is wound or unwound from the reel.

A further object of the invention is to provide a swingable guide or guiding unit for a hose reel, or the like, as and for the purposes aforesaid, together with a latching mechanism for retaining the guide in selected angular positions as may be required in unwinding the hose from the reel, and further, with such latching mechanism comprising a combined hand actuated lever and handle by which the operator may simultaneously release said latching mechanism and manipulate the guiding unit in the manner of a level winder.

Another object of the invention is to provide a swingable guide or guiding device for an electrically operated hose reel, or the like, embodying any or more or all of the foregoing described features of construction, and wherein said latching mechanism for retaining the guide in selected angular positions is provided with a combined hand actuated lever and handle along with an electrical switch on said handle by which the operator need use only one hand to control the rotation of the electrically operated reel in the direction for rewinding the hose thereon while simultaneously releasing said latching mechanism and manipulating the guiding device in the manner of a level winder for the hose.

Further objects and advantages, and other new and useful features in the construction, arrangement and general combination of parts of the invention will be apparent as the following description proceeds with reference to the accompanying drawings, for purposes of illustration but not of limitation, in which like reference characters designate like parts throughout, and in which:

Fig. 3 is a vertical sectional view through the approximate longitudinal center line of the guiding device as shown in Fig. 2;

Fig. 4 is a vertical sectional view of Fig. 3 along line 4—4, looking in the direction of the arrows; and, Fig. 5 is a sectional view of Fig. 3 along line 5—5, looking in the direction of the arrows.

Figure 1:
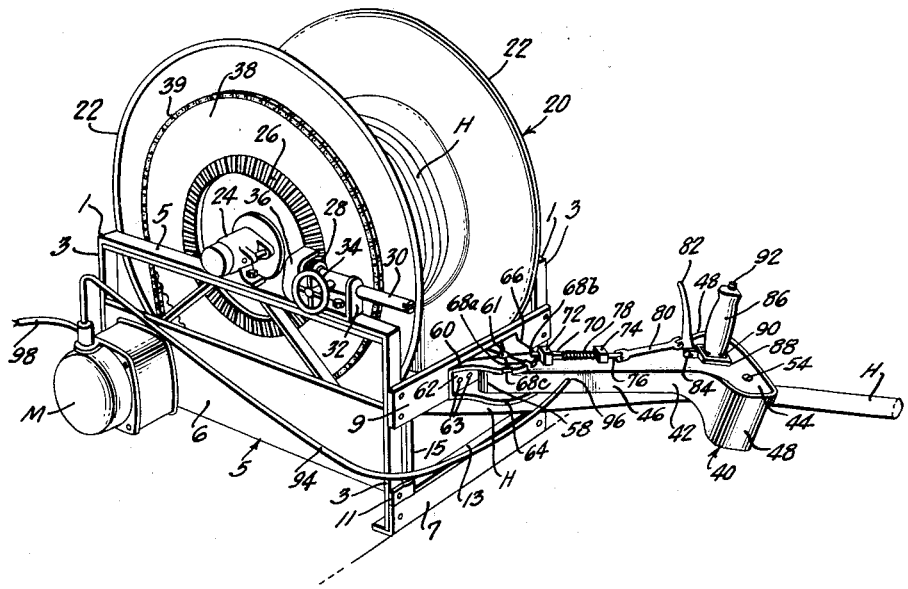
Fig. 1 is a perspective view of a typical installation comprising an electrically operated hose reel apparatus provided with a guide or guiding unit in accordance with the invention.

Referring now, more particularly, to the drawings, the improved guide or guiding unit of the invention is disclosed by way of illustration only, as employed in what is commonly known as bucket box type of hose reel apparatus. It is to be understood, however, that the invention is not limited in any manner or form to the specific type of hose reel shown but rather, is equally adaptable to a wide range and variety of other applications and uses in any similar or related type of hose reel fluid delivery apparatus, as well as reels for cable, rope and similar lengths of material. It is to be understood, further, that the term "fluid" as used in this description is intended to refer to all types of liquids and gases, such as oil, water, and air.

In the present example, the support S for the hose reel is shown provided by a frame defined by spaced side members 1 each of which comprises spaced vertical posts 3 carrying a horizontal bar or beam 5 and connected by a longitudinal side plate 6 serving as a strengthening means for the frame and as a support for mounting the electrical motor M which drives the rewinding mechanism for the hose reel, as presently to be described. The posts 3 are secured in laterally spaced relation by lower cross bars 7 bolted, riveted, welded or otherwise secured thereto, and which define means for mounting the apparatus in any desired installation, as on a fuel delivery truck, for example. An upper cross bar 9 is also usually secured to the forward vertical posts 3 to provide the frame with the required strength and rigidity, and such a cross bar preferably is provided, as shown, by a sufficiently strong and durable mounting plate for the guiding unit in a new apparatus or as a replacement or added member, where necessary, in any reel apparatus already in use.

At the lower ends of the forward vertical posts 3, suitable bearing plates 11 are secured in position to provide bearings for the ends of a horizontal roller 13 and the lower ends of spaced vertical rollers 15 having their upper ends retained in suitable bearings provided on or attached to the cross plate 9. Thus, the space between the cross plate 9, the horizontal roller 13 and the spaced vertical rollers 15 defines a generally rectangular guideway through which the hose H passes on being wound or unwound from the reel, with said rollers 13, 15 serving as antifriction means minimizing resistance, drag and wear on the hose in any such operation.

The hose reel, designated generally 20, comprises a pair of spaced discs 22 at each side of a central drum having a well known conventional construction in which said drum is provided with a concealed L-shaped elbow that is connected at its inner end in communication with a source of fluid supplied through a tubular inlet end of the reel shaft (not shown) extending axially through the center of said drum. The ends of the reel shaft preferably are provided in the manner of extensions which project beyond the discs 22 of the reel in position to be supported by suitable bearings 24 bolted or otherwise secured on the horizontal beams 5 of the side members 1 of the reel supporting frame. The extension on the tubular inlet end of the reel shaft is a tubular shaft portion having a suitable coupling for connection to the source of fluid and with the bearing therefor preferably provided with a fluid-tight packing joint. The hose H is connected to the outlet end of said concealed elbow within the drum of the reel, and from this point is coiled between the discs 22 for unwinding from the rear of the reel 20 as necessary to move readily in a path under the cross plate 9 and through the aforesaid guideway defined by the antifriction rollers 13, 15.

In order to provide for manual rewinding of the reel, when necessary, a ring gear 26 is riveted or otherwise concentrically attached to the outer side of one of the reel discs 22 and in mesh therewith is a pinion 28 on a crank shaft 30 which is supported in a bracket 32 secured on the horizontal beam 5 of the adjacent side frame member 1. The outer end of the crank shaft 30 extends free for engagement by a suitable crank to turn the pinion 28 and ring gear 26 and thereby rotate the reel 20 in rewinding the hose H thereon. A brake is also provided to lock the pinion 28 against movement when the hose H is fully wound on the reel so as to prevent unintended unwinding of the hose. To this end, a brake wheel 34 is employed having a spindle provided with a screw mounting on the bracket 32 so that the leading end of said spindle is in position to bear upon and retain the pinion or crank shaft 30 against movement when said wheel 34 is turned to locking position or, conversely, to clear the pinion shaft 30 and permit free rotation thereof when said wheel 34 is turned to unlocked position. Preferably a safety shield or guard 36 is secured in position to cover the pinion 28.

A sprocket gear 38 is riveted or otherwise secured to the reel disc 22 facing the motor M and a sprocket chain 39 is meshed with said gear 38 and in connection with a drive sprocket (not shown) driven by the shaft of the electrical motor M such that said motor, when energized, produces the power to rotate said reel 20 for automatic rewinding of the hose H thereon.

The improved guiding unit of the invention, designated generally 40, is provided in the manner of a swingable arm or boom 42 at the front of the reel 20. In the preferred design shown, said swingable arm 42 is constructed as an elongate hollow body having a generally T-shaped contour when viewed from the top or base 44 thereof and an open underside along its length except at the forward end or head thereof. The construction of the guide arm 42 as an elongate hollow body is such that it is admirably suited for economical quantity production at relatively low cost by casting the same of aluminum or other lightweight metal. Additionally, such a guide arm 42 provided as a one-piece aluminum casting involves important advantages in that it is as strong and durable as necessary for all required purposes, relatively light in weight and thereby easily manipulated in the operation and use thereof, and otherwise readily fabricated in a compact, streamlined and symmetrical design having a highly pleasing and attractive appearance.

The sides 46 of the guide arm 42 are defined by spaced walls extending generally lengthwise thereof and flaring outwardly into rounded head portions 48 adjacent the open outer end of the guide arm. An underlying plate portion 50 extends between said outwardly flared and rounded head portions 48, and these portions together with the overlying portion of the top or base 44 define a housing for a pair of feed rolls 52 at the open outer end of the guide arm 42. These feed rolls 52 preferably are highly polished and precisely shaped to snugly engage the hose H in the most effective manner and with the least amount of wear. Said feed rolls 52 are rotatably mounted on vertical axes defined by pintles 54 extending through axial bores therein including bushings 53, Fig. 4, with said pintles 54 having their ends secured in any suitable manner in aligned holes in the underlying bottom plate 50 and overlying top portion 44 of the housing, Figs. 3 and 4. In the preferred construction shown, said pintles 54 are provided by pins having heads bearing on the overlying top portion 44 of the housing with the opposite ends thereof retained by cotter pins 55 or similar securing means.

Preferably the hollow body of the guide arm 42 is provided with a strengthening rib or fin 56, Figs. 3 and 5, extending lengthwise along the underside thereof and united to a solid block portion 58, Fig. 3, at the rearward end of said guide arm. The block 58 is provided with a vertical bore 59 and the imperforate upper and lower faces thereof define strong solid bearing surfaces adapted to withstand the load on the rearward end of said guide arm 42 as pivotally mounted on a complementary bracket 60 by a pivot pin 61 for swinging movement across the front of the reel 20.

The bracket 60 also is preferably a cast aluminum article and has a generally U-shaped cross section comprising a vertical back wall 62 between a pair of spaced horizontal flanges 64, 66, provided in a generally semicircular formation. The back wall 62 of said bracket is secured by bolts 63 or other suitable means to the heavy cross plate 9 provided at the front of the reel for mounting the guiding unit 40 thereon, as aforesaid, and the flanges 64, 66 are provided with holes which align with the bore 59, Fig. 3, in the rear end of the guide arm 42 for receiving the pivot pin 61 in providing for the pivotal swinging movement of said guide arm 42 in the completed mounting. The upper flange 66 of said bracket 60 has its outer semicircular periphery formed with a series of spaced notches or slots 68a, b and c adapted to receive the end of a cooperating latching or slide bolt 70 to retain the guide arm 42 in selected locations at the front of the reel in any of a straight forward, right angular or left angular operating position, respectively.

The latching bolt 70 is slidably mounted on the guide arm 42 in a preferred construction wherein the top 44 of said guide arm is cast with a pair of integral lugs 72, 74. The lug 72, Fig. 3, defines an apertured ear slidably receiving said latching bolt 70, and a slide rod 76 secured to the end of said latching bolt 70 by an adjustable threaded connection, extends in slidable relation through a suitable passage in the other lug 74. A coil spring 78, telescoped over said slide rod 76 has one end bearing against the lug 74 and its other end bearing on the latching bolt 70 to maintain said latching bolt 70 in normally projected latching position. A link 80 is pivotally connected at its ends to the slide rod 76 and to a lever 82 pivotally mounted by an integral hinge ear 84 provided on the top 44 of the guide arm 42 in operative relation to a handle 86. The handle 86 includes an enlarged lower flange 88 by which said handle is secured by bolts 90 to the top 44 of the guide arm adjacent the forward end thereof in position to be gripped by the operator for manipulating said guide arm 42 in any intended purpose and use thereof.

The handle 86 is provided with a push button switch 92, Fig. 3, secured in the outer end of a longitudinal bore in said handle 86 in connection with an electrical wire 94 extending downwardly through said bore in the handle and through a passage 96 in the adjacent side 46 of the guide arm 42, as illustrated in Figs. 1 and 5, where it is connected to the electrical motor M mounted on the hose reel frame in operative relation to the hose reel rewinding mechanism, as aforesaid. The electrical motor M in turn is connected by a conduit 98, Fig. 1, to a suitable source of electricity which, in the case of an installation on a fuel delivery truck, is the battery of the vehicle.

In the completed apparatus wherein the guiding device 40 of the invention is mounted in operative position at the front of the reel, as shown in Fig. 1, the hose H runs from the rear of the reel 20 through the guideway in the frame defined by the spaced vertical anti-friction rollers 15 and the horizontal roller 13, where it extends along the underside of the guide arm 42 and between the feed rolls 52. The free end of the hose H, accordingly, projects from the forward end of the guide arm 42 in position to be easily and quickly pulled from the reel for any desired dispensing operation. In this regard, there are many instances when the hose H must be pulled from the reel in right or left angular relation thereto, as aforesaid, whereupon the guide arm 42 is set to extend in the proper direction for leading the hose in any such angular relation from the reel 20 without damaging kinking, chafing and other undue wear on said hose H.

Figure 2:
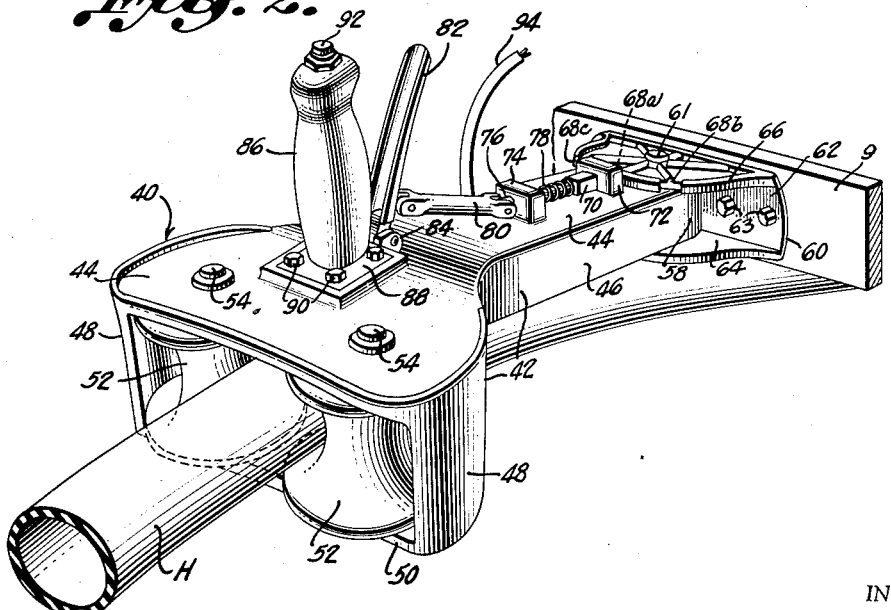
Fig. 2 is an enlarged perspective view of the improved guiding unit of the invention shown employed in Fig. 1.

By way of illustration, Fig. 2 shows the guide arm 42 in straight forward position where it is locked by the latching bolt 70 received in the center slot 68a on the bracket flange 66. When the hose H is to be drawn from the reel in right angular relation thereto, the latching bolt 70 is retracted from said slot 68a to released position by pulling the lever 82 forwardly, whereupon the guide arm 42 is free for swinging by the handle 86 to the right angular position shown in Fig. 1, for example. The guide arm 42 is locked in such right angular relation to the reel by the latching bolt 70 received in the adjacent slot 68b in the bracket flange 66 under force of the coil spring 78 when the pull on the lever 82 is removed. Likewise, when the hose H is to be drawn from the reel in left angular relation thereto, the latching bolt 70 is similarly released by pull on the lever 82 and the guide arm 42 swung by the handle 86 to extend toward the left of the reel where it is locked in such position by the latching bolt 70 received in the slot 68c on said bracket flange 66.

In the automatic rewinding of the hose H on the reel through power supplied by the electrical motor M, the guide 40 serves in the manner of a level winder for leading the hose H in neat and uniform successive convolutions across the drum of the reel without piling up on any portion of the drum. The arrangement is such that the lever 82, and the handle 86 and switch 92 thereon are all so located that the operator need use only one hand for pulling said lever 82 to release the latching bolt 70 and simultaneously pressing the push button on the switch 92 to energize the motor M for turning the reel 20 to rewind the hose H thereon, while also gripping the handle 86 to swing the guide arm 42 back and forth across the front of the reel to serve as a level winder for said hose H as it is rewound on the reel 20.

When the hose H is fully rewound on the reel 20, the push button on the switch 92 is released, of course, to stop the motor M, whereupon the apparatus is in readiness for the guide arm 42 to be adjusted to the proper angular position for the hose to be drawn from the reel as required for the next dispensing operation, after which said hose is rewound on the reel with the guiding unit 40 serving as a level winder for the hose in a repetition of the foregoing described procedure.

While the invention has described in detail with a specific example, such example is intended as an illustration only, inasmuch as it will be apparent that other modifications in the construction, arrangement and general combination of parts may be provided without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. In an apparatus comprising a reel for a hose or other length of material, a support for said reel and rewinding mechanism for said reel comprising an electrical motor for driving said rewinding mechanism, a guiding unit for said hose or other length of material comprising a guide arm adapted to be pivotally mounted on said support for horizontal swinging movement across the front of the reel, means on said guide arm for releasably locking said guide arm in selected forward or angular relation to said reel, means on said guide arm for releasing said locking means and swinging said guide arm across the front of the reel for use as a level-wind, and means on said guide arm comprising an electrical switch in circuit with an electrical wire connected to said electrical motor for controlling said rewinding mechanism of the reel.

2. In an apparatus comprising a reel for a hose or other length of material, a support for said reel and rewinding mechanism for said reel comprising an electrical motor for driving said rewinding mechanism, a guiding unit comprising a bracket adapted to be secured to said support and having a flange provided with a series of laterally spaced stops, a guide arm having its rearward end pivotally mounted on said bracket for horizontal swinging movement across the front of the reel, a bolt on said guide arm adapted for selective engagement with said stops to releasably lock said guide arm in selected forward or angular relation to said reel, means for releasing said bolt and swinging said guide arm across the front of the reel for use as a level-wind, and a switch on said guide arm in circuit with an electrical wire connected to said electrical motor for controlling said rewinding mechanism for the reel.

3. In an apparatus comprising a reel for a hose or other length of material, a support for said reel and rewinding mechanism for said reel comprising an electrical motor for driving said rewinding mechanism, a guiding unit comprising a bracket adapted to be secured to said support for the reel and having a flange provided with a series of laterally spaced stops defined by slots in said flange, a guide arm comprising a base and a bearing at the rearward end of said base pivotally mounted on said bracket for horizontal swinging movement of said guide arm across the front of the reel, a bolt on said base of the guide arm adapted for selective engagement in said slots in said flange on the bracket to releasably lock said guide arm in selected forward or angular relation to said reel, means for releasing said bolt and swinging said guide arm across the front of the reel for use as a level-wind, and a switch on said guide arm in circuit with an electrical wire connected to said electrical motor for controlling said rewinding mechanism for the reel.

4. In an apparatus comprising a reel for a hose or other length of material, a support for said reel and rewinding mechanism for said reel comprising an electrical motor for driving said rewinding mechanism, a guiding unit comprising a bracket adapted to be secured to said support for the reel and having a flange provided with a series of laterally spaced stops defined by slots in said flange, a guide arm comprising a base and a bearing at the rearward end of said base pivotally mounted on said bracket for horizontal swinging movement of said guide arm across the front of the reel, a bolt on said base of the guide arm adapted for selective engagement in said slots in said flange on the bracket to releasably lock said guide arm in selected forward or angular relation to said reel, a lever on said base in connected relation with said bolt and adapted to be actuated for releasing said bolt, a handle on said base adjacent said lever for swinging said guide arm across the front of the reel for use as a level-wind, and an electrical switch on said handle in circuit with an electrical wire connected to said electrical motor for controlling said rewinding mechanism for the reel.

5. In an apparatus comprising a reel for a hose or other length of material and a support for said reel, a guiding unit comprising a bracket adapted to be secured to said support and having a flange provided with a series of laterally spaced stops, a guide arm comprising a base having laterally projecting head portions at the forward end of said guide arm, pintles depending from said head portions of the base and a pair of cooperating feed rolls rotatably secured on said pintles, a bearing at the rearward end of said base pivotally mounted on said bracket for horizontal swinging movement of said guide arm across the front of the reel, a bolt on said base of the guide arm adapted for selective engagement with said stops on said flange on the bracket to releasably lock said guide arm in selected forward or angular relation to said reel, and means for releasing said bolt and swinging said guide arm across the front of the reel for use as a level-wind.

6. In an apparatus comprising a reel for a hose or other length of material and a support for said reel, a guiding unit comprising a bracket adapted to be secured to said support and having a flanged provided with a series of laterally spaced stops defined by slots in said flange, a guide arm comprising a base having laterally projecting head portions at the forward end of said guide arm, pintles depending from said head portions of the base and a pair of cooperating feed rolls rotatably secured on said pintles, a bearing at the rearward end of said base pivotally mounted on said bracket for horizontal swinging movement of said guide arm across the front of the reel, a bolt on said base of the guide arm adapted for selective engagement in said slots in said flange on the bracket to releasably lock said guide arm in selected forward or angular relation to said reel, a lever on said base in connected relation with said bolt and adapted to be actuated for releasing said bolt, and a handle on said base for swinging said guide arm across the front of the reel for use as a level-wind.

7. In an apparatus comprising a reel for a hose or other length of material and a support for said reel, a guiding unit comprising a bracket adapted to be secured to said support for the reel and having a flange provided with a series of laterally spaced stops defined by slots in said flange, a guide arm comprising an elongate hollow body defining a base having enlarged laterally projecting head portions at the forward end of said guide arm and walls depending from the sides of said base along the length of said guide arm and from the sides of said laterally projecting head portions, pintles depending from said head portions and a pair of cooperating feed rolls rotatably secured on said pintles, a bearing at the rearward end of said base pivotally mounted on said bracket for horizontal swinging movement of said guide arm across the front of the reel, a bolt on said base of the guide arm adapted for selective engagement in said slots in said flange on the bracket to releasably lock said guide arm in selected forward or angular relation to said reel, a lever on said base in connected relation with said bolt and adapted to be actuated for releasing said bolt, and a handle on said base adjacent said lever for swinging said guide arm across the front of the reel for use as a level-wind.

8. In an apparatus comprising a reel for a hose or other length of material, a support for said reel and rewinding mechanism for said reel comprising an electrical motor for driving said rewinding mechanism, a guiding unit comprising a bracket adapted to be secured to said support for the reel and having a flange provided with a series of laterally spaced stops defined by slots in said flange, a guide arm comprising a base having laterally projecting head portions at the forward end of said guide arm, pintles depending from said head portions and a pair of cooperating feed rolls rotatably secured on said pintles, a bearing at the rearward end of said base pivotally mounted on said bracket for horizontal swinging movement of said guide arm across the front of the reel, a bolt on said base of the guide arm adapted for selective engagement in said slots in said flange on the bracket to releasably lock said guide arm in selected forward or angular relation to said reel, a lever on said base in connected relation with said bolt and adapted to be actuated for releasing said bolt, a handle on said base adjacent said lever for swinging said guide arm across the front of the reel for use as a level-wind, and an electrical switch on said handle in circuit with an electrical wire connected to said electrical motor for controlling said rewinding mechanism for the reel.

9. In an apparatus comprising a reel for a hose or other length of material, a support for said reel and rewinding mechanism for said reel comprising an electrical motor for driving said rewinding mechanism, a guiding unit comprising a bracket adapted to be secured to said support for the reel and having a substantially semicircular flange provided with a series of laterally spaced stops defined by slots on the periphery of said semicircular flange, a guide arm comprising an elongate hollow body defining a base having enlarged laterally projecting head portions at the forward end of said guide arm and walls depending from the sides of said base along the length of said guide arm and from the sides of said laterally projecting head portions, pintles depending from said head portions and a pair of cooperating feed rolls rotatably secured on said pintles, a bearing at the rearward end of said base pivotally mounted on said bracket for horizontal swinging movement of said guide arm across the front of the reel, a slidable bolt on said base of the guide arm adapted for selective engagement in said slots in said flange on the bracket to releasably lock said guide arm in selected forward or angular relation to said reel, a lever on said base in connected relation with said bolt and adapted to be actuated for releasing said bolt, a handle on said base adjacent said lever for swinging said guide arm across the front of the reel for use as a level-wind, and an electrical switch on said handle in circuit with an electrical wire connected to said electrical motor for controlling said rewinding mechanism for the reel.

References Cited in the file of this patent

UNITED STATES PATENTS

| Number | Name | Date |
| --- | --- | --- |
| 414,809 | Grove | Nov. 12, 1889 |
| 636,004 | Milbrath | Oct. 31, 1899 |
| 667,788 | Murchison | Feb. 12, 1901 |
| 690,324 | Schmitt | Dec. 31, 1901 |
| 2,121,916 | Jacobsen | June 28, 1938 |